(12) United States Patent
Tamura

(10) Patent No.: US 11,693,426 B2
(45) Date of Patent: Jul. 4, 2023

(54) VEHICLE CONVEYANCE CONTROL APPARATUS, VEHICLE CONVEYANCE CONTROL METHOD AND VEHICLE CONVEYANCE SYSTEM

(71) Applicant: Honda Motor Co., Ltd., Tokyo (JP)

(72) Inventor: Kazuya Tamura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 17/080,689

(22) Filed: Oct. 26, 2020

(65) Prior Publication Data

US 2021/0132629 A1 May 6, 2021

(30) Foreign Application Priority Data

Nov. 1, 2019 (JP) ................................. 2019-199558

(51) Int. Cl.
*G05D 1/02* (2020.01)
*B60S 9/14* (2006.01)
*G08G 1/00* (2006.01)
*G08G 1/14* (2006.01)

(52) U.S. Cl.
CPC ............ *G05D 1/0291* (2013.01); *B60S 9/14* (2013.01); *G05D 1/0212* (2013.01); *G08G 1/144* (2013.01); *G08G 1/20* (2013.01)

(58) Field of Classification Search
CPC ...... G05D 1/0291; G05D 1/0212; B60S 9/14; G08G 1/144; G08G 1/20
USPC .......................................................... 701/2
See application file for complete search history.

(56) References Cited

U.S. PATENT DOCUMENTS

| | | | | |
|---|---|---|---|---|
| 11,492,055 | B2 * | 11/2022 | Ibenthal | E04H 6/36 |
| 2010/0183409 | A1 * | 7/2010 | Checketts | E04H 6/305 |
| | | | | 414/281 |
| 2015/0139764 | A1 * | 5/2015 | Jang | B66F 17/00 |
| | | | | 414/458 |
| 2019/0250614 | A1 * | 8/2019 | Ito | B60W 30/06 |
| 2021/0132629 | A1 * | 5/2021 | Tamura | G08G 1/144 |
| 2021/0347290 | A1 * | 11/2021 | Fu | B60P 3/064 |

FOREIGN PATENT DOCUMENTS

| | | | | |
|---|---|---|---|---|
| DE | 102018221173 | A1 * | 6/2020 | ............. B60G 17/00 |
| JP | 2016216936 | A | 12/2016 | |

OTHER PUBLICATIONS

EPO English translation of DE-102018221173-A1 (Year: 2018).*

* cited by examiner

*Primary Examiner* — Yazan A Soofi
(74) *Attorney, Agent, or Firm* — Duft & Bornsen, PC

(57) ABSTRACT

A vehicle conveyance control apparatus for controlling a plurality of conveyance devices, includes a processor and a memory coupled to the processor. Each of the plurality of conveyance devices is configured to lift each tire of a vehicle to convey the vehicle from a predetermined area of a parking lot to a parking space. The processor is configured to perform: acquiring vehicle information including tire position information of each tire of the vehicle detected in the predetermined area; selecting conveyance devices to convey the vehicle from among the plurality of conveyance devices different in conveyance capacity for lifting each tire of the vehicle to convey the vehicle based on the tire position information of the vehicle acquired in the acquiring; and instructing the conveyance devices selected in the selecting to convey the vehicle from the predetermined area to the parking space.

8 Claims, 7 Drawing Sheets

VEHICLE CONVEYANCE CONTROL APPARATUS, VEHICLE CONVEYANCE CONTROL METHOD AND VEHICLE CONVEYANCE SYSTEM

CROSS-REFERENCE TO RELATED APPLICATION

This application is based upon and claims the benefit of priority from Japanese Patent Application No. 2019-199558 filed on Nov. 1, 2019, the content of which is incorporated herein by reference.

BACKGROUND OF THE INVENTION

Field of the Invention

This invention relates to a vehicle conveyance control apparatus and a vehicle conveyance control method for controlling a conveyance device for conveying a vehicle to a parking space, and a vehicle conveyance system.

Description of the Related Art

This type of apparatus has been disclosed, for example, in Japanese Laid-Open Patent Application No. 2016-216936 (JP2016-216936A). In the apparatus of JP2016-216936A, the size of the vehicle to be conveyed is detected using one type of conveyance device capable of automatic travel, and the vehicle is conveyed to the parking space of the parking lot using one type of conveyance device based on the detected size of the vehicle.

There exist various sizes of vehicle ranks for vehicles to be parked in parking spaces. Therefore, for example, as the device described in JP2016-216936A, when transporting multiple types of vehicles using single type of conveyance device, if a vehicle size exceeding the conveyance capacity of the conveyance device is detected, it is necessary to dispatch another conveyance device to the vehicle, it is not efficient.

SUMMARY OF THE INVENTION

An aspect of the present invention is a vehicle conveyance control apparatus for controlling a plurality of conveyance devices. Each of the plurality of conveyance devices is configured to lift each tire of a vehicle to convey the vehicle from a predetermined area of a parking lot to a parking space. The vehicle conveyance control apparatus includes: a processor and a memory coupled to the processor. The processor is configured to perform: acquiring vehicle information including tire position information of each tire of the vehicle detected in the predetermined area; selecting conveyance devices to convey the vehicle from among the plurality of conveyance devices different in conveyance capacity for lifting each tire of the vehicle to convey the vehicle based on the tire position information of the vehicle acquired in the acquiring; and instructing the conveyance devices selected in the selecting to convey the vehicle from the predetermined area to the parking space.

Another aspect of the present invention is a vehicle conveyance control method for controlling a plurality of conveyance devices. Each of the plurality of conveyance devices is configured to lift each tire of a vehicle to convey the vehicle from a predetermined area of a parking lot to a parking space. The vehicle conveyance control method includes: acquiring vehicle information including tire position information of each tire of the vehicle detected in the predetermined area; selecting conveyance devices to convey the vehicle from among the plurality of conveyance devices different in conveyance capacity for lifting each tire of the vehicle to convey the vehicle based on the tire position information of the vehicle acquired in the acquiring; and instructing the conveyance devices selected in the selecting to convey the vehicle from the predetermined area to the parking space.

Another aspect of the present invention is a vehicle conveyance system, includes: the vehicle conveyance control apparatus; a vehicle information detection device configured to detect the vehicle information including the tire position information of each tire of the vehicle in the predetermined area; and the plurality of conveyance devices different in conveyance capacity for lifting each tire of the vehicle to convey the vehicle from the predetermined area to the parking space.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
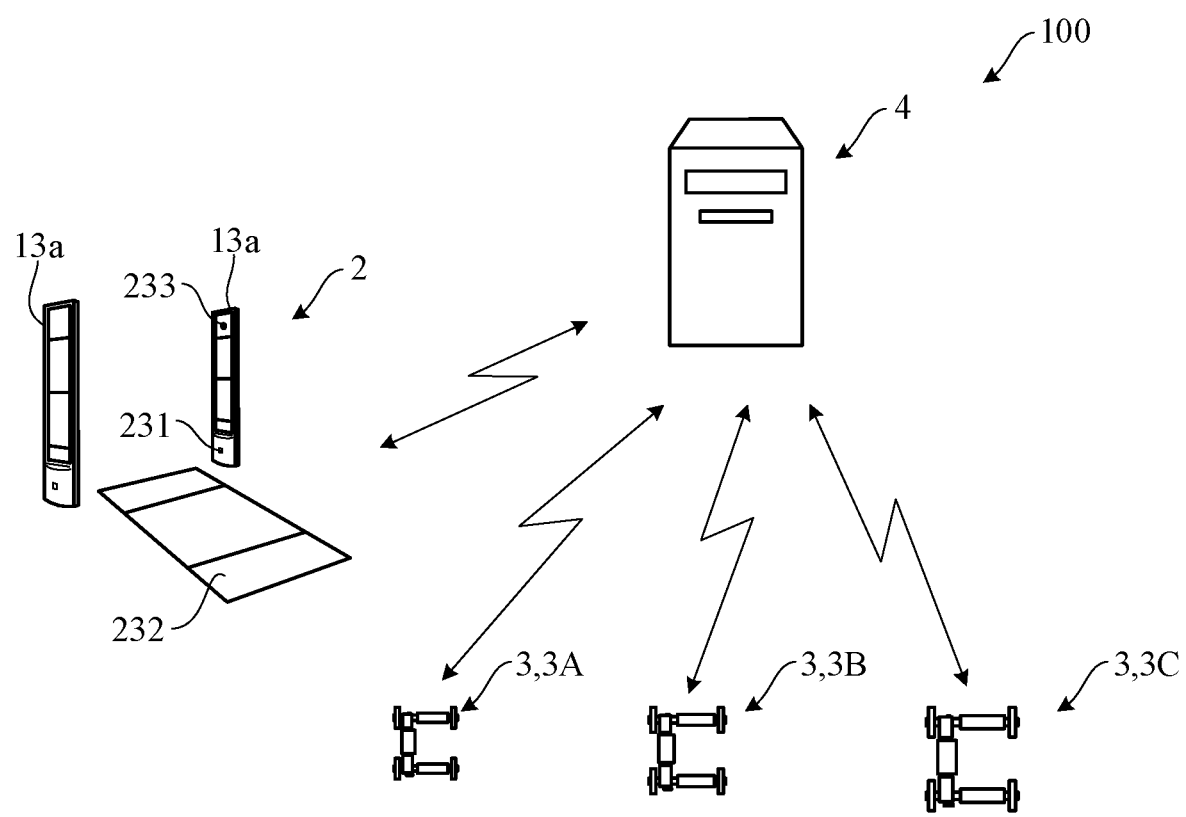
FIG. 1 is a diagram schematically showing configuration of a vehicle automatic parking system using a server device according to an embodiment of the present invention.

An embodiment of the present invention is explained with reference to FIG. 1 to FIG. 8 in the following. A vehicle conveyance control apparatus according to the embodiment of the present invention is suitably applied to make a vehicle automatically park in a parking space of a parking lot by controlling drive of a plurality of conveyance devices for lifting each tire of the vehicle to make the vehicle capable of unmanned travel.

In the present embodiment, the vehicle conveyance control apparatus makes the vehicle automatically park in the parking space of parking lot by controlling drive of the conveyance devices of the same number as the number of tires of the vehicle. For example, the vehicle conveyance control apparatus controls drive of four conveyance devices to make a four-wheel vehicle automatically park in the parking space of the parking lot, and controls drive of two conveyance devices to make a two-wheel vehicle automatically park in the parking space of the parking lot.

Recently, automatic travel vehicles are developed rapidly, and in near future, it is predicted that the conventional manned vehicles will be substituted by the unmanned vehicles. When the unmanned vehicles become common, parking operation in parking lots also becomes automated, thereby eliminating needs for staff resident in parking lots and the like. It also becomes possible to park more vehicles close to each other in high-density by making occupants get out of the vehicles and thereafter making only the vehicles automatically travel to the respective parking spaces, for example. In this way, the spread of automatic travel vehicles may improve management efficiency and earnings of the parking lots, for example.

However, even when the automatic travel vehicles become popular, there may still exist automatic travel vehicles without automatic parking function or manned vehicles without automatic travel function. In such case, parking lots, other than dedicated parking lots for the automatic travel vehicles, will be used by vehicles without automatic parking function or automatic travel function. Therefore, in such cases, parking staff for guiding manned vehicles or waiting rooms for drivers are still needed.

In the present embodiment, vehicles without automatic parking function or automatic travel function are made to automatically park in the parking space of the parking lot by controlling conveyance devices for lifting each tire of vehicles to make vehicles capable of unmanned travel. With this, needs for parking staff for guiding manned vehicles or waiting rooms for drivers are eliminated, thereby improving management efficiency of the parking lots.

For example, tire position information of each tire of a vehicle entering a parking lot is acquired, vehicle rank of the vehicle is estimated based on the acquired tire position information, conveyance devices, of the same number as the number of tires of the vehicle, that can lift the vehicle are selected based on the estimated vehicle rank, and the selected conveyance devices are instructed to convey the vehicle. As this, by acquiring the tire position information and selecting conveyance devices capable of lifting the vehicle based on the acquired tire position information to deploy them to the vehicle, it becomes possible to efficiently conduct automatic parking of the vehicle.

In this time, by outputting the tire position information of the vehicle to the selected conveyance devices, the selected conveyance devices move in accordance with the outputted tire position information. Specifically, the conveyance devices move toward each tire of the vehicle based on the outputted tire position information without searching for the tire by themselves. With this, each conveyance device can easily and accurately move toward each tire as compared with a case where each conveyance device search each tire, for example.

In the vehicle conveyance system according to the present embodiment, the above vehicle automatic parking service is provided using: the vehicle conveyance control apparatus; a vehicle information detection device configured to detect vehicle information including the tire position information of each tire of the vehicle in a predetermined area; and the conveyance devices configured to lift each tire of the vehicle to convey the vehicle in the parking space of the parking lot. With this, needs for parking staff resident in parking lots, thereby enabling high-density parking of more vehicles close to each other. Thus, the management efficiency and earnings of the parking lots becomes improved.

In the present embodiment, to properly provide automatic parking service as described above, an automatic parking system (vehicle conveyance system) using a server device is provided as follows.

Figure 2:
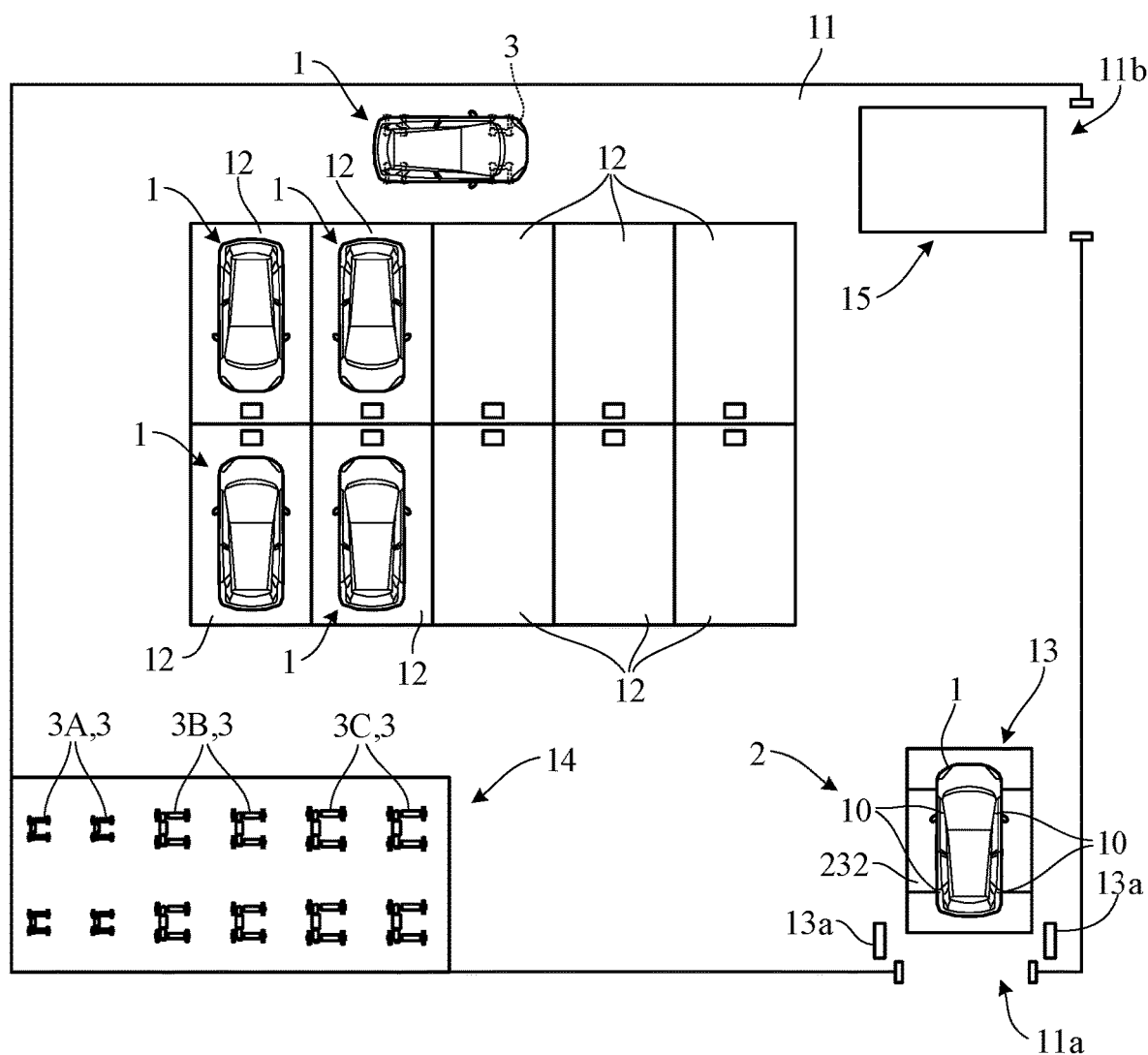
FIG. 2 is a plan view of a parking lot, to which the vehicle automatic parking system shown in FIG. 1 is applied.

FIG. 1 is a diagram schematically showing configuration of an automatic parking system 100 for a vehicle 1 using a server device 4 according to the embodiment of the present invention. FIG. 2 is a plan view of a parking lot 11, to which the automatic parking system 100 for the vehicle 1 shown in FIG. 1 is applied. In the automatic parking system 100 according to the present embodiment, the vehicle conveyance control apparatus is mainly constituted by the server device 4, and the vehicle 1 to be parked is mainly constituted by a four-wheel vehicle.

As shown in FIG. 1 and FIG. 2, the automatic parking system 100 includes: a vehicle information detection device 2 configured to detect vehicle information including tire position information of each tire 10 of the vehicle 1 in an information acquisition area (predetermined area) 13; a plurality of conveyance devices 3 each configured to lift each tire 10 of the vehicle 1 to convey the vehicle 1 to a parking space 12 in the parking lot 11; and the server device 4 provided on the side of a business entity (not shown) that manages the parking lot 11.

In the present embodiment, the vehicle information detection device 2 detects: tire position information of each tire 10 of the vehicle 1; weight information (also simply referred to as "weight" in the following) of the vehicle 1; and size information of the vehicle 1, as the vehicle information. The weight information of the vehicle 1 includes gross weight information of the vehicle 1, front weight information and rear weight information of the vehicle 1. The size information of the vehicle 1 includes total length (vehicle length) information, total width (vehicle width) information and total height (vehicle height) information of the vehicle 1.

As shown in FIG. 1, the vehicle information detection device 2 and the plurality of conveyance devices 3 are configured to be wirelessly communicable with the server device 4, respectively. Although three kinds of conveyance devices 3 different in conveyance capacity (small conveyance device 3A, medium conveyance device 3B and large conveyance device 3C) are shown in FIG. 1 and FIG. 2, the kinds of the conveyance devices 3 are not limited to this. In the automatic parking system, for example, two kinds of conveyance devices can be used and four or more kinds of conveyance devices can be used.

The conveyance capacity is a capacity for lifting each tire 10 of the vehicle 1 to convey the vehicle 1 of the conveyance device 3. In the present embodiment, the conveyance capacity is set based on the vehicle weight. For example, the small conveyance device 3A is configured to be conveyable four-wheel vehicle whose vehicle weight is equal to or smaller than one ton, the middle conveyance device 3B is configured to be conveyable four-wheel vehicle whose vehicle weight is larger than one ton and equal to or smaller than two tons, and the large conveyance device 3C is configured to be conveyable four-wheel vehicle whose vehicle weight is larger than two tons.

As shown in FIG. 2, the plurality of conveyance devices 3 are configured to stand by in a standby area 14 provided in the parking lot 11, and charging of batteries 33 (described later) of the conveyance devices 3 and the like are conducted in the standby area 14. For example, each conveyance device 3 is assigned with a standby position in the standby area 14, and the battery 33 is charged at the predetermined standby position in the standby area 14. Each conveyance device 3 is configured to output standby signal to the server device 4 when returning to the standby area 14.

The conveyance device 3 moves, in response to conveyance instruction from the server device 4, from the standby area 14 to the information acquisition area 13 for the vehicle 1 of the acquired vehicle information, and lifts each tire 10 of the vehicle 1 to park in the predetermined parking space 12. To convey the vehicle 1 from the parking space 12, the conveyance device 3 moves, in response to the conveyance instruction from the server device 4, from the standby area 14 to the parking space 12 at which the vehicle 1 to be conveyed is parked, and lifts each tire 10 of the vehicle 1 to convey the vehicle 1 to an exit area 15 provided near an exit 11*b*.

In the present embodiment, although the information acquisition area 13, where the vehicle information detection device 2 is provided, is provided near an entrance 11*a* in the parking lot 11, the information acquisition area can be provided out of the parking lot 11, for example, in an area adjacent to the parking lot 11. In this case, the plurality of conveyance devices 3 is configured to lift each tire 10 of the vehicle 1 parking at a predetermined position other than the information acquisition area, for example, in the parking lot 11.

Here, configuration of the conveyance device 3 for lifting each tire 10 of the vehicle 1 to convey the vehicle 1 will be briefly explained referring to FIG. 3A to FIG. 4B.

Figure 3A:
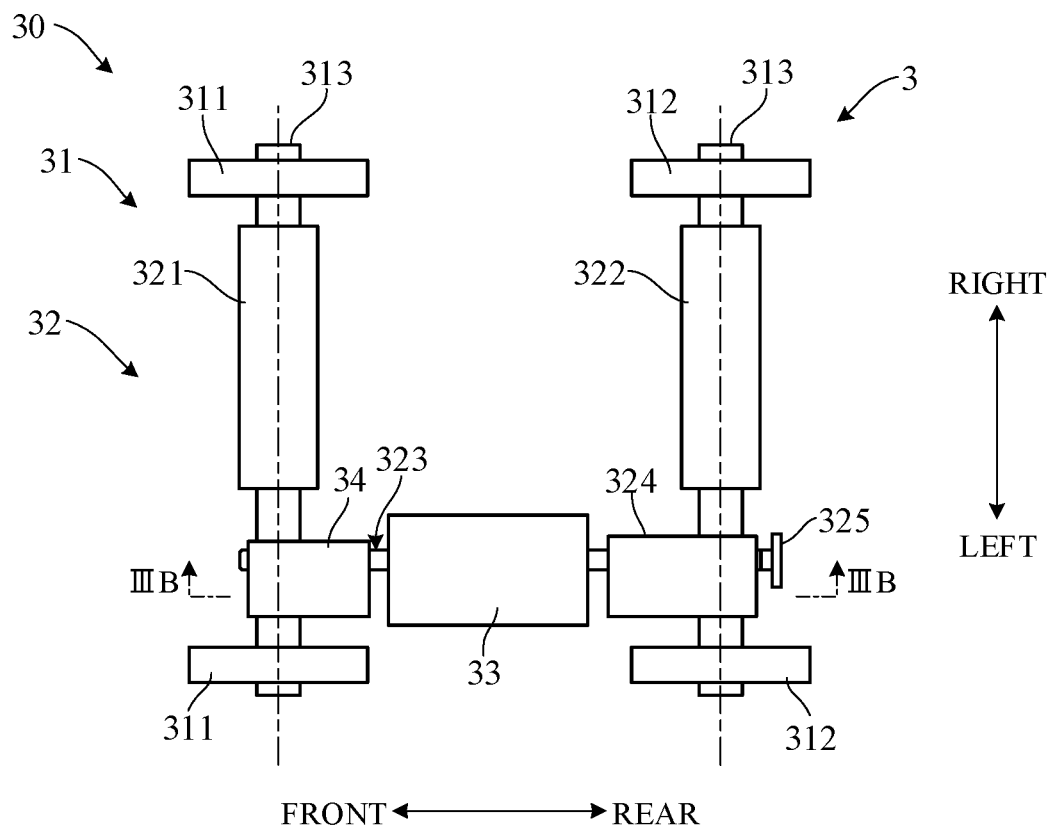
FIG. 3A is a plan view schematically showing a conveyance device constituting the automatic parking system shown in FIG. 1.
Figure 3B:
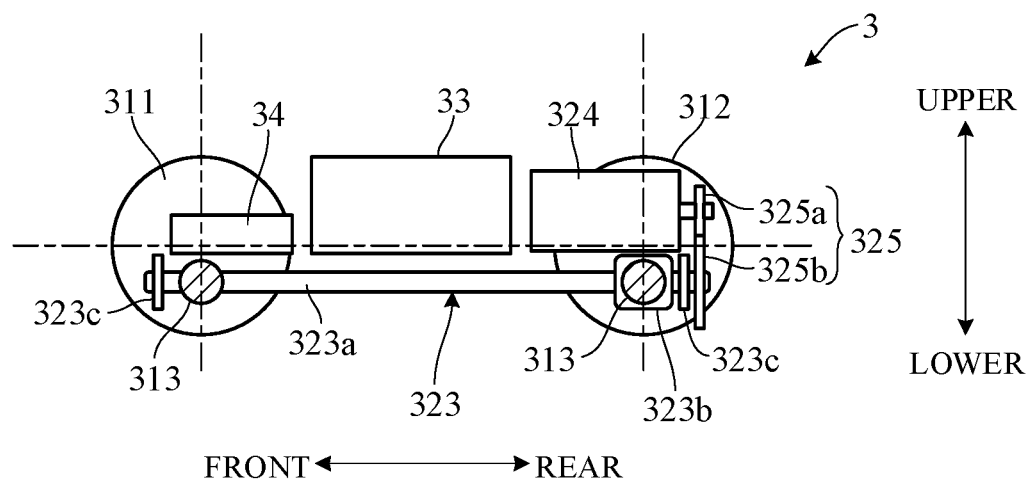
FIG. 3B is a sectional view of the conveyance device shown in FIG. 3A, along axis IIIB-IIIB.
Figure 4A:
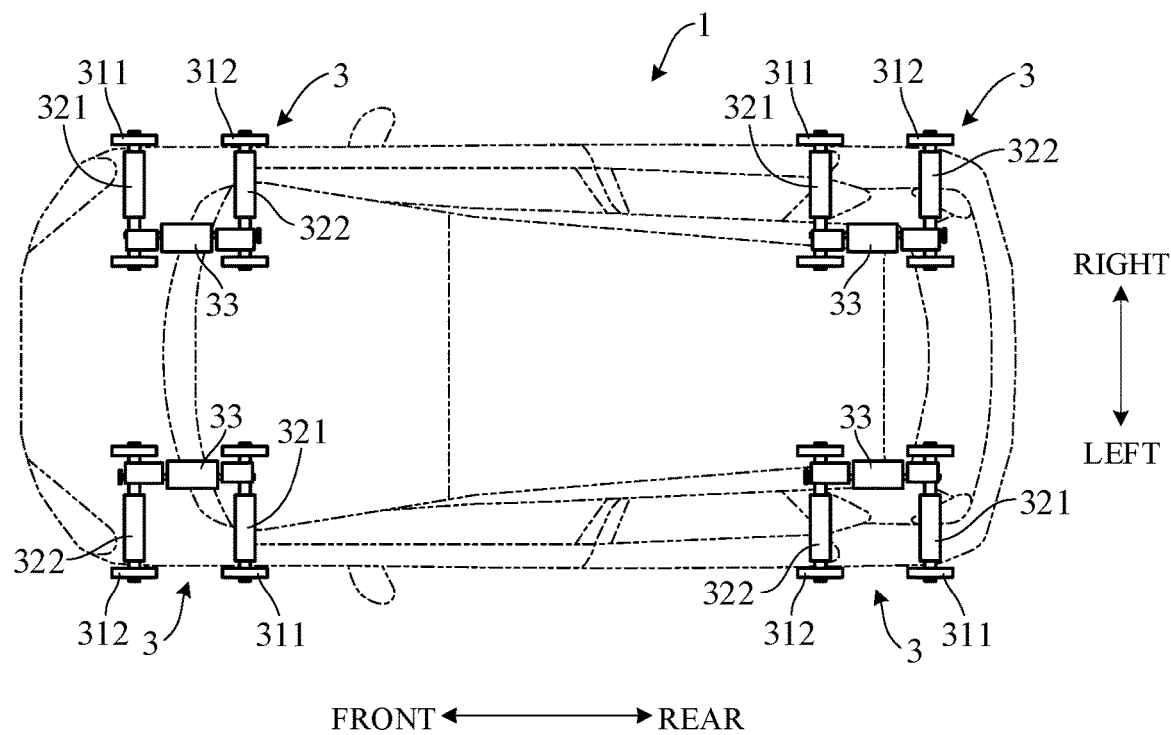
FIG. 4A is a plan view of the vehicle with its tires lifted by the conveyance devices shown in FIG. 3A and FIG. 3B.
Figure 4B:
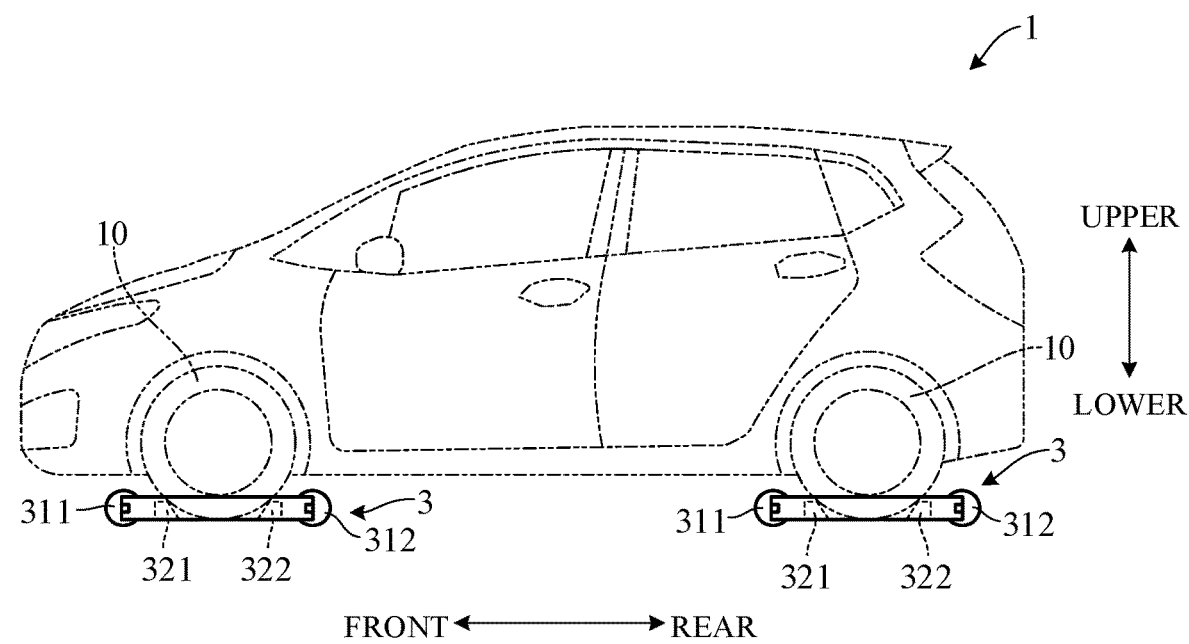
FIG. 4B is a side view of the vehicle with its tires lifted by the conveyance devices shown in FIG. 3A and FIG. 3B.

FIG. 3A is a plan view schematically showing the conveyance device 3 constituting the automatic parking system 100 shown in FIG. 1. FIG. 3B is a sectional view of the conveyance device 3 shown in FIG. 3A, along axis IIIB-IIIB. FIG. 4A is a plan view of the vehicle 1 with its tires 10 lifted by the conveyance devices 3 shown in FIG. 3A and FIG. 3B. FIG. 4B is a side view of the vehicle 1 with its tires 10 lifted by the conveyance devices 3 shown in FIG. 3A and FIG. 3B.

In the following, for convenience, front-rear direction, left-right direction, and upper-lower direction as shown in the drawings are defined, and the configuration of each part will be described in accordance with this definition.

As shown in FIG. 3A and FIG. 3B, the conveyance device 3 is mainly includes a body unit 30, a travel unit 31, a lift mechanism 32, the battery 33, and a processing unit (control unit) 34, and the conveyance device 3 is formed in a substantially U-shaped shape having an opening on one side in plan view. The body unit 30 is formed by a frame or the like (not shown) that supports these components constituting the conveyance device 3.

The travel unit 31 includes a pair of front wheels 311, 311 located on the front side of the body unit 30 and rotatably supported on an axle 313, and a pair of rear wheels 312, 312 located on the rear side of the body unit 30 and rotatably supported on the axle 313. Each front wheel 311 and each rear wheel 312 is configured by an omni wheel. The conveyance device 3 can travel in all directions in the horizontal direction including the front-rear direction and the upper-lower direction by the omni-wheel.

The omni-wheel is configured to be driven to rotate by a motor (not shown). As the omni-wheel used for each front wheel 311 and each rear wheel 312, a general one can be used, and thus description thereof is omitted here. Each front wheel 311 and each rear wheel 312 need not necessarily be the omni-wheels, but preferably an omnidirectional wheel which is movable in the entire plane direction, as long as it is movable in two directions as the front-rear direction and the upper-lower direction. For example, each front wheel 311 and each rear wheel 312 can be mechanic wheels.

The lift mechanism 32 includes a front abutting member 321 abutting the tread portion on the front side of the tire 10, a rear abutting member 322 abutting the tread portion on the rear side of the tire 10, a relative moving mechanism 323 relatively moving the front abutting member 321 and the rear abutting member 322 in the front-rear direction, and a motor 324 for driving the relative moving mechanism 323.

The front abutting member 321 is formed in a substantially cylindrical shape extending in the left-right direction, and is rotatably supported by the axle 313 in a state in which the axle 313 of the pair of front wheels 311, 311 is inserted into the hollow portion. The rear abutting member 322 is formed in a substantially cylindrical shape extending in the left-right direction, and is rotatably supported by the axle 313 in a state in which the axle 313 of the pair of rear wheels 312, 312 is inserted into the hollow portion. The front abutting member 321 and the rear abutting member 322 are formed by an elastically deformable elastic member. By bringing the front abutting member 321 and the rear abutting member 322 close to each other, the tire 10 is pushed up by the front abutting member 321 and the rear abutting member 322.

In the present embodiment, the relative moving mechanism 323 is formed by a ball screw mechanism. The relative moving mechanism 323 includes a screw shaft 323*a* arranged along the front-rear direction, a nut member 323*b* moving in the front-rear direction on the screw shaft 323*a*, a bearing portion 323*c* supporting the screw shaft 323*a*, and a base portion (not shown) on which the bearing portion 323*c* is provided. The base portion is fixed to the body unit 30, and an output shaft of the motor 324 is connected to one end of the screw shaft 323*a* through a speed reducer 325. The speed reducer 325 includes, for example, a small diameter gear 325*a* rotating integrally with the output shaft of the motor 324, and a large diameter gear 325*b* meshing with the small diameter gear 325*a* and rotating integrally with the screw shaft 323*a*.

In the present embodiment, the nut member 323*b* is fixed to the axle 313 of the pair of rear wheels 312, 312, and, when the screw shaft 323*a* rotates by driving the motor 324, the nut member 323*b* moves in the front-rear direction and the pair of rear wheels 312, 312 moves toward the pair of front wheels 311, 311.

The battery 33 powers and drives the motor (not shown) for driving the omni-wheel (each front wheel 311 and each rear wheel 312) and the motor 324 for driving the relative moving mechanism 323. The processing unit (control unit) 34 will be described later.

The conveyance device 3 configured as described above, enters under the vehicle body of the vehicle 1, while moving under the vehicle body, the opening side of the conveyance device 3 is positioned in the left-right direction inside of the tire 10 of the vehicle 1 so as to face the tire 10. Then, as shown in FIG. 4A, so as to sandwich the tire 10 in the front abutting member 321 and the rear abutting member 322, the conveyance device 3 moves from the left-right direction inside of the vehicle body toward the outside. Incidentally, in FIG. 4A, although the opening side of the conveyance device 3 is arranged so as to face the left-right direction outer side of the vehicle 1 and the battery 33 side is arranged so as to face the left-right direction inner side of the vehicle 1, the opening side of the conveyance device 3 can be arranged so as to face the left-right direction inner side of the vehicle 1 and the battery 33 side can be arranged so as to face the left-right direction outer side of the vehicle 1. Part of the plurality of conveyance devices 3 can be arranged such that the opening side faces the left-right direction inner side of the vehicle 1, and the remaining conveyance devices 3 can be arranged such that the battery 33 side faces the left-right direction inner side of the vehicle 1.

After the tire 10 is positioned between the front abutting member 321 and the rear abutting member 322, the rear abutting member 322 is moved forward of the conveyance device 3 by the relative moving mechanism 323, causing the front abutting member 321 and the rear abutting member 322 to abut the tread portion on the tire 10 as shown in FIG. 4B. Further movement of the rear abutting member 322 to the front side of the conveyance device 3 lifts the tire 10 with rotation of the front abutting member 321 and the rear abutting member 322 abutting the tread portion on the tire 10. For example, the tire 10 is lifted by about 5 cm to 10 cm. In FIG. 4B, the conveyance devices 3 that lift the tires 10 of the right front wheel and the right rear wheel of the vehicle 1 in FIG. 4A, but the conveyance devices 3 that lift the tires 10 of the left front wheel and the left rear wheel of the vehicle 1 also operate in the same manner.

In this manner, the tire 10 sandwiched between the front abutting member 321 and the rear abutting member 322 is lifted upward, and all of the tires 10 of the vehicle 1 are lifted, whereby the vehicle 1 becomes movable by the plurality of conveyance devices 3. Thus, since each conveyance device 3 lifts each tire 10 by moving below the vehicle body, enabling high-density parking of more vehicles 1 close to each other.

From the point of view of lifting the tire 10 under the vehicle body, the conveyance device 3 is preferably as low as possible in its overall height. For example, the conveyance device 3 preferably has a total height of 150 mm or less, more preferably 140 mm or less, and still more preferably 130 mm or less. From the viewpoint that the ground minimum height of the vehicle 1 in the security standards of Japan is set to 90 mm, it is most preferable that the total height of the conveyance device 3 is less than 90 mm, and the versatility is high.

Figure 5:
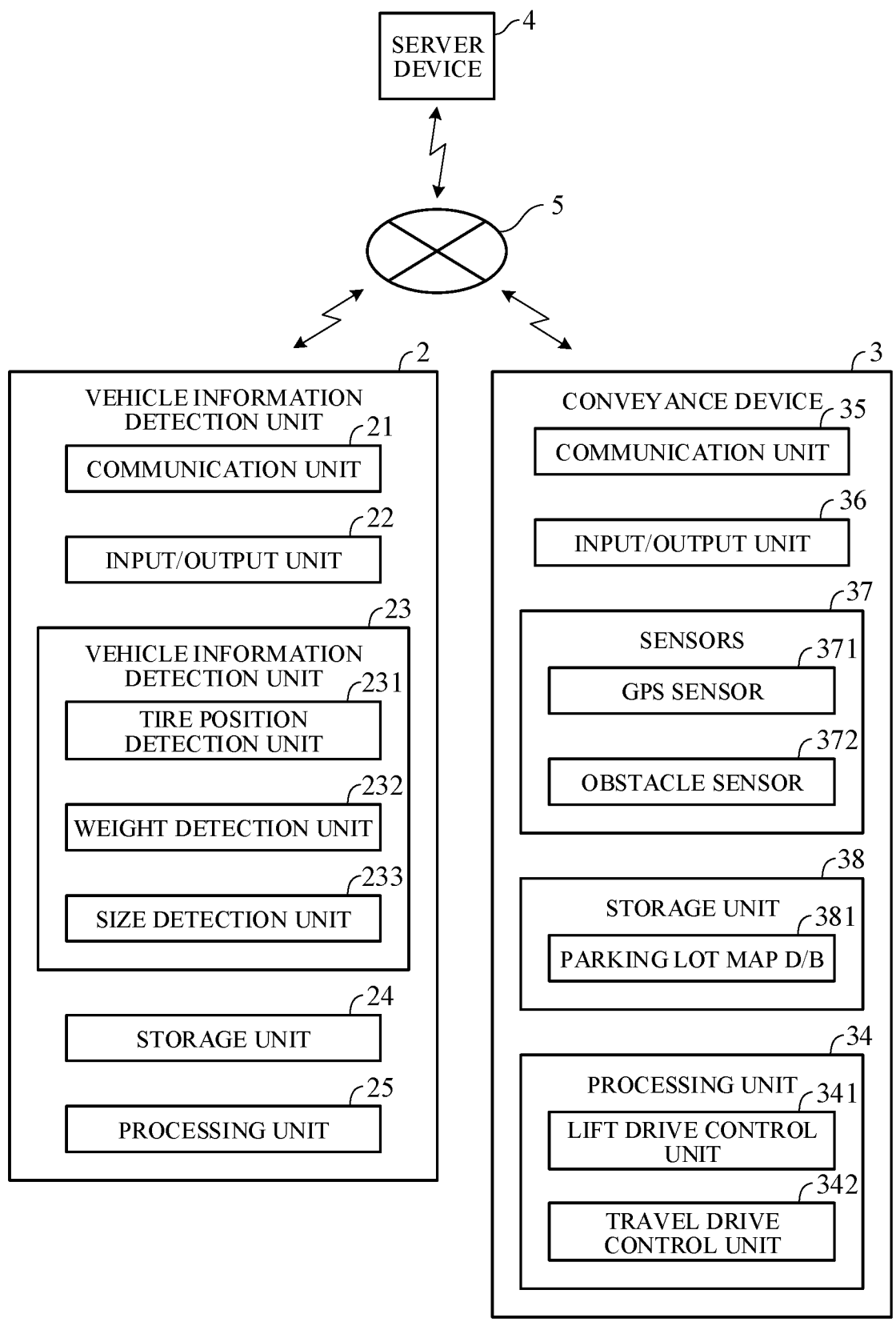
FIG. 5 is a block diagram showing main configuration of the automatic parking system shown in FIG. 1.
Figure 6:
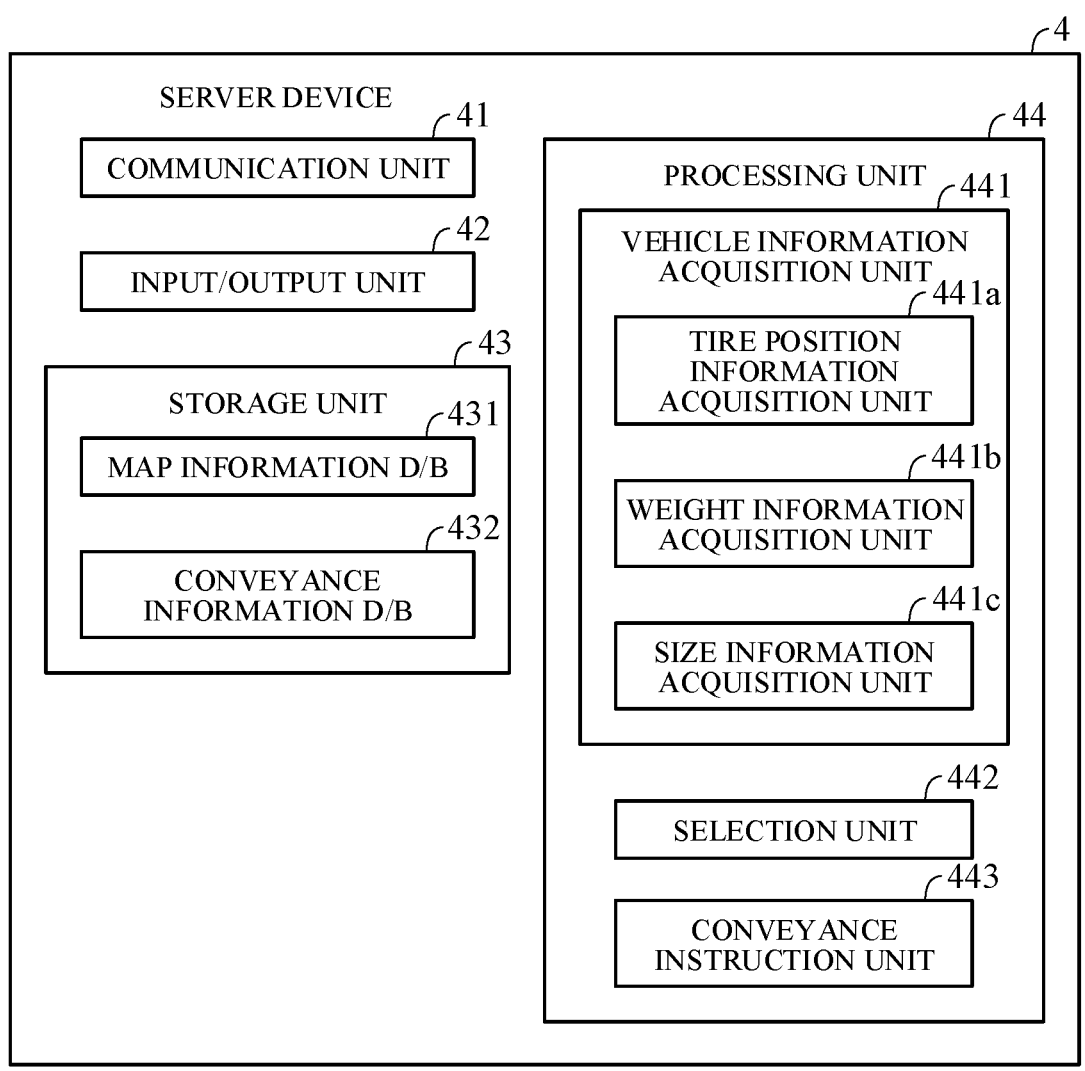
FIG. 6 is a block diagram showing main configuration of the server device shown in FIG. 5.

FIG. 5 is a block diagram showing main configuration of the automatic parking system 100 shown in FIG. 1. FIG. 6 is a block diagram showing main configuration of the server device 4 shown in FIG. 5. As described above, the automatic parking system 100 includes the vehicle information detection device 2, the plurality of conveyance devices 3, and the server device 4. As shown in FIG. 5, the vehicle information detection device 2, the conveyance device 3, and the server device 4 are connected to a communication network 5 such as a wireless communication network, an internet network, a telephone line network, and the like. Although FIG. 5 shows one conveyance device 3 for the sake of convenience, a plurality of types of conveyance devices 3 (for example, the conveyance devices 3A, 3B, 3C) are actually connected to the communication networks 5 as described above.

As shown in FIG. 5, the vehicle information detection device 2 includes a communication unit 21, an input/output unit 22, a vehicle information detection unit 23, a storage unit 24, and a processing unit 25. The communication unit 21 is configured to be capable of wireless communication with the server device 4 through the communication network 5. The input/output unit 22 includes, for example, various switches, buttons, microphones, speakers, monitors, and the like that can be operated by an administrator of the parking lot 11. The input/output unit 22 is used, for example, for the vehicle information detection device 2 maintenance, repair operations, and the like.

The vehicle information detection unit 23 detects vehicle information of the vehicle 1 parking at the parking lot 11. The vehicle information detection unit 23 includes a tire position detection unit 231, a vehicle weight detection unit 232, and a size detection unit 233.

The tire position detection unit 231 detects positions of each tires 10 of the vehicle 1. For example, the tire position detection unit 231 detects positions of each front tires 10 and positions of each rear tires 10 of the vehicle 1. In the present embodiment, the tire position detection unit 231 is constituted by a camera having imaging elements such as CCD or CMOS, is attached to a gate 13a provided on the information acquisition area 13 in the parking lot 11. The tire position detection unit 231 captures images the front and rear wheels of the vehicle 1 passing through the gate 13a and detects the position of each tire 10 of the vehicle 1 using common image-processing techniques based on the captured images.

The vehicle weight detection unit 232 detects weight (vehicle weight) of the vehicle 1. The vehicle weight detection unit 232 is constituted by, for example, a plate-shaped weight sensor laid on the information acquisition area 13 in the parking lot 11, and the vehicle weight is detected by stopping the vehicle 1 on the vehicle weight detection unit 232. In the present embodiment, the vehicle weight detection unit 232 is divided into the front and the rear. Based on the weight input from the front wheel of the vehicle 1 and the weight input from the rear wheel of the vehicle 1 in addition to the total weight of the vehicle 1, the vehicle front weight and rear weight of the vehicle 1 can be detected or measured.

The size detection unit 233 detects size of the vehicle 1. In the present embodiment, the size detection unit 233 detects total length (vehicle length), total width (vehicle width) and total height (vehicle height) of the vehicle 1. The size detection unit 233 is constituted by a camera having imaging elements such as CCD or CMOS, is attached to the gate 13a provided on the information acquisition area 13 in the parking lot 11. The size detection unit 233 captures images the vehicle 1 passing through the gate 13a and detects the total length (vehicle length), total width (vehicle width) and total height (vehicle height) of the vehicle 1 using common image-processing techniques based on the captured images.

The storage unit 24 includes volatile or non-volatile memories (not shown). The storage unit 24 stores various programs executed by the processing unit 25 and various types of data. For example, a tire position detection program for the tire position detection unit 231, a vehicle weight detection program for the vehicle weight detection unit 232, a size detection program for the size detection unit 233, and the like are stored in the storage unit 24. The storage unit 24 temporarily stores, for example, various data detected by the vehicle information detection unit 23.

The processing unit 25 includes a CPU. The processing unit 25 executes predetermined processing based on signals received from outside the vehicle information detection device 2 through the communication unit 21, signals input through the input/output unit 22, various programs and various types of data stored in the storage unit 24, and the like, and outputs control signals to the communication unit 21, the input/output unit 22, and the storage unit 24.

For example, the processing unit 25 outputs control signals to the communication unit 21 to control transmission/reception of signals between the vehicle information detection device 2 and the server device 4. For example, the processing unit 25 transmits various information detected by the vehicle information detection unit 23 to the server device 4 through the communication unit 21. For example, the processing unit 25 executes the above described tire position detection program, vehicle weight detection program, vehicle size detection program and the like stored in the storage unit 24.

As shown in FIG. 5, the conveyance device 3 includes a communication unit 35, an input/output unit 36, sensors 37, a storage unit 38, and a processing unit 34. Description for the configuration of the above described conveyance device 3 is omitted here.

The communication unit 35 is configured to be capable of wireless communication with the server device 4 through the communication network 5. The input/output unit 36 includes, for example, various switches, buttons, microphones, speakers, monitors, and the like that can be operated by the administrator of the parking lot 11. The input/output unit 36 is used, for example, for the conveyance device 3 maintenance, repair operations, and the like.

The sensors 37 includes various sensors that detect status or condition of the conveyance device 3. For example, the sensors 37 includes a GPS sensor 371 to detect the position of the conveyance device 3 by receiving signals from GPS satellites and an obstacle sensor 372 to avoid obstacles in the parking lot 11. Although not shown, an acceleration sensor for detecting an acceleration acting on the conveyance device 3, a gyro sensor for detecting an angular velocity, a travel distance sensor for detecting a travel distance, a remaining battery capacity detecting sensor for detecting a remaining battery capacity, and the like are also included in the sensors 37.

The storage unit 38 includes volatile or non-volatile memories (not shown). The storage unit 38 stores various programs executed by the processing unit 34 and various types of data. For example, the storage unit 38 temporarily stores various data detected by the sensors 37. The stored detected data is transmitted to the server device 4 at predetermined time intervals through the communication unit 35 by processing at the processing unit 34.

The storage unit 38 includes a parking lot map data base 381 as a functional configuration of the memory. The parking lot map data base 381 stores map data of the parking lot (map information). For example, the parking lot map data base 381 stores parking position information of each parking space 12, the information acquisition area 13, the standby area 14, the exit area 15, and the like in the parking lot.

The processing unit 34 includes a CPU. The processing unit 34 executes predetermined processing based on signals received from outside the conveyance device 3 through the communication unit 35, signals input through the input/output unit 36, various programs and various types of data stored in the storage unit 38, and the like, and outputs control signals to the communication unit 35, the input/output unit 36, and the storage unit 38. For example, the processing unit 34 outputs control signals to the communication unit 35 to control transmission/reception of signals between the conveyance device 3 and the server device 4. For example, the processing unit 34 transmits various information detected by the sensors 37 to the server device 4 through the communication unit 35 at predetermined time intervals.

The processing unit 34 includes a lift drive control unit 341, and a travel drive control unit 342 as a functional configuration of the processor.

The lift drive control unit 341 controls drive of the above described lift mechanism 32. For example, the lift drive control unit 341 controls drive of the above described motor 324 of the lift mechanism 32 to drive the relative moving mechanism 323 so as to make the front abutting member 321 and the rear abutting member 322 lift the tire 10.

The travel drive control unit 342 controls drive of the above described travel unit 31. For example, the travel drive control unit 342 controls drive of each motor of the above described motors (not shown) for driving the omni-wheel constituting each front wheel 311 and each rear wheel 312 of the travel unit 31 so as to make the conveyance device 3 moves.

The server device 4 is provided, for example, on the side of the business entity that manages the parking lot 11. The server device 4 can also be configured using a virtual server function on the cloud service. As shown in FIG. 6, the server device 4 includes a communication unit 41, an input/output unit 42, a storage unit 43, and a processing unit.

The communication unit 41 is configured to be capable of wireless communication with the vehicle information detection device 2 and each conveyance device 3 respectively through the communication network 5. The input/output unit 42 includes, for example, various switches, buttons (for example, keyboard, touch panel, or the like), microphones, speakers, monitors, and the like that can be operated by the administrator of the parking lot 11. The input/output unit 42 is used, for example, for the server device 4 maintenance, repair operations, and the like.

The storage unit 43 includes volatile or non-volatile memories (not shown). The storage unit 43 stores various programs executed by the processing unit 44 and various types of data. The storage unit 43 includes a map information data base 431 (map information storage unit), a conveyance information data base 432 (conveyance information storage unit) as a functional configuration of the memory. Specifically, the memory performs functions as the map information data base 431 (map information storage unit) and the conveyance information data base 432 (conveyance information storage unit).

The map information data base 431 stores map data of the parking lot (map information). For example, the map information data base 431 stores parking position information of each parking space 12, the information acquisition area 13, the standby area 14, the exit area 15, and the like in the parking lot. When the conveyance device 3 detects obstacles, the map data is overwritten with data reflecting the detected result.

The conveyance information data base 432 stores conveyance devices 3 selected by a selection unit 442 (described below), the parking space 12 of the parking lot 11 instructed by a conveyance instruction unit 443 (described below), and a conveyance route to the parking space 12. The conveyance information data base 432 stores these parking information by referring to the map information data base 431.

The processing unit 44 includes a CPU (processor). The processing unit 44 executes predetermined processing based on signals received from outside the server device 4 through the communication unit 41, signals input through the input/output unit 42, various programs and various types of data stored in the storage unit 43, and the like, and outputs control signals to the communication unit 41, the input/output unit 42, and the storage unit 43.

The processing unit 44 includes a vehicle information acquisition unit 441 that acquires vehicle information of the vehicle 1 to be parked, the selection unit 442 that selects conveyance devices 3 to convey the vehicle 1, and the conveyance instruction unit 443 that outputs conveyance instruction of the vehicle 1 to the parking space 12 as a functional configuration of the processor. Specifically, the processor performs functions as the vehicle information acquisition unit 441, the selection unit 442, and the conveyance instruction unit 443.

The vehicle information acquisition unit 441 includes a tire position information acquisition unit 441a, a weight information acquisition unit 441b, and a size information acquisition unit 441c.

The tire position information acquisition unit 441a acquires tire position information of each tire 10 of the vehicle 1 detected by the vehicle information detection device 2 through the communication unit 41. Specifically, the tire position information acquisition unit 441a acquires tire position information of each front tires 10 and tire position information of each rear tires 10 of the vehicle 1 through the communication unit 41.

The weight information acquisition unit 441b acquires weight information of the vehicle 1 detected by the vehicle information detection device 2 through the communication unit 41. In the present embodiment, the weight information acquisition unit 441b acquires the front weight information and rear weight information of the vehicle 1 in addition to the total weight information of the vehicle 1 detected by the vehicle information detection device 2.

The size information acquisition unit 441c acquires size information of the vehicle 1 detected by the vehicle information detection device 2 through the communication unit 41. Specifically, the size information acquisition unit 441c acquires total length information (vehicle length information), total width information (vehicle width information) and total height information (vehicle height information) of the vehicle 1 detected by the vehicle information detection device 2

The selection unit 442 selects, from among the plurality of conveyance devices 3 (for example, the conveyance devices 3A, 3B, 3C) different in conveyance capacity for lifting each tire 10 of the vehicle 1 to convey the vehicle 1, corresponding conveyances devices 3 (for example, four conveyance devices 3A) based on the vehicle information of the vehicle 1 acquired by the vehicle information acquisition unit 441. In the present embodiment, the selection unit 442 selects corresponding four conveyances devices 3 (for example, four conveyance devices 3A) from among three kinds of conveyance devices 3A, 3B, 3C different in conveyance capacity based on the tire position information of each tire 10 of the vehicle 1 acquired by the tire position information acquisition unit 441a and the weight information of the vehicle 1 acquired by the weight information acquisition unit 441b.

For example, the selection unit 442 estimates a vehicle rank of the vehicle 1 based on the tire position information of each tire 10 of the vehicle 1 acquired by the tire position information acquisition unit 441a, and selects conveyance devices 3 of the same number as the number of tires of the vehicle, that can lift the vehicle 1 based on the estimated vehicle rank. For example, the selection unit 442 estimates a wheel base of the vehicle 1 based on the tire position information of each tire 10 of the vehicle 1, and estimates the vehicle rank based on the estimated wheel base. Then, the selection unit 442 estimates a vehicle weight based on the estimated vehicle rank, and selects four conveyance devices 3 based on the estimated vehicle weight.

The selection unit 442 selects four conveyance devices 3 that can lift the vehicle 1 based on the estimated vehicle rank based on the total weight information and the front and rear weight information of the vehicle 1 acquired by the weight information acquisition unit 441b.

Then, the selection unit 442 determines respective conveyance devices 3 of the same number as the number of tires of the vehicle, that can lift the vehicle 1, based on these information. For example, the selection unit 442 determines the conveyance device 3 for each front tire 10 and the conveyance device 3 for each rear tire 10.

The conveyance instruction unit 443 outputs the conveyance instruction of the vehicle 1 to the parking space 12 to the conveyance devices 3 selected by the selection unit 442. For example, the conveyance instruction unit 443 outputs the conveyance instruction of the vehicle 1 to the parking space 12 to each of the conveyance devices 3 of the same number as the number of tires of the vehicle 1 selected by the selection unit 442. Specifically, the conveyance instruction unit 443 sends the tire position information of each tire 10 of the vehicle 1 stopping at the information acquisition area 13 and the tire position information of each tire 10 for parking at the parking space 12 in the parking lot 11 to each of the four conveyance devices 3 selected by the selection unit 442.

Upon receiving the tire position information of each tire 10 of the vehicle 1 stopping at the information acquisition area and the tire position information of each tire 10 for parking at the parking space 12 in the parking lot 11 from the conveyance instruction unit 443, each of the conveyance device 3 moves to the vehicle 1 stopping at the information acquisition area 13 based on the tire position information of each tire 10 in the received information acquisition area, and lifts each tire 10 there. Then, moves to the parking space 12 based on the tire position information of each tire 10 in the received parking space 12 to park the vehicle 1 at the parking space 12.

The conveyance instruction unit 443 instructs the parking space 12 and the conveyance route to the parking space 12 to the conveyance devices 3 selected by the selection unit 442 based on the map information of the parking lot 11 stored in the map information data base 431 and the size information of the vehicle 1 acquired by the size information acquisition unit 441c. For example, the conveyance instruction unit 443 detects the parking space 12 at which the vehicle 1 can be parked, calculates the conveyance route from the information acquisition area 13 to the detected parking space 12, and instructs the parking space 12 and the conveyance route to the parking space 12 based on these information.

At this time, the conveyance instruction unit 443 records the conveyance devices 3 selected by the selection unit 442, the retrieved parking space 12, the tire position information of each tire 10 in the parking space 12, and the conveyance route from the information acquisition area 13 to the parking space 12 in the conveyance information data base 432 (parking information).

The conveyance instruction unit 443 also outputs conveyance instruction of the vehicle 1 from the parking space 12 based on the conveyance devices 3 selected by the selection unit 442, the parking space 12 at which the vehicle 1 is parked, the tire position information of each tire 10 in the parking space 12, and the conveyance route from the information acquisition area 13 to the parking space 12 stored in the conveyance information data base 432. For example, the conveyance instruction unit 443 outputs conveyance instruction of the vehicle 1 from the parking space 12 to the exit area 15. If the entrance 11a and the exit 11b of the parking lot 11 are the same (common), the vehicle 1 can be conveyed from the parking space 12 along the convey route for parking, without calculating a new conveyance route for exiting. Even if the entrance and the exit are not common as the parking lot 11 exemplified in FIG. 2, a part of the conveyance route for parking can be diverted as the conveyance route for exiting.

Figure 7:
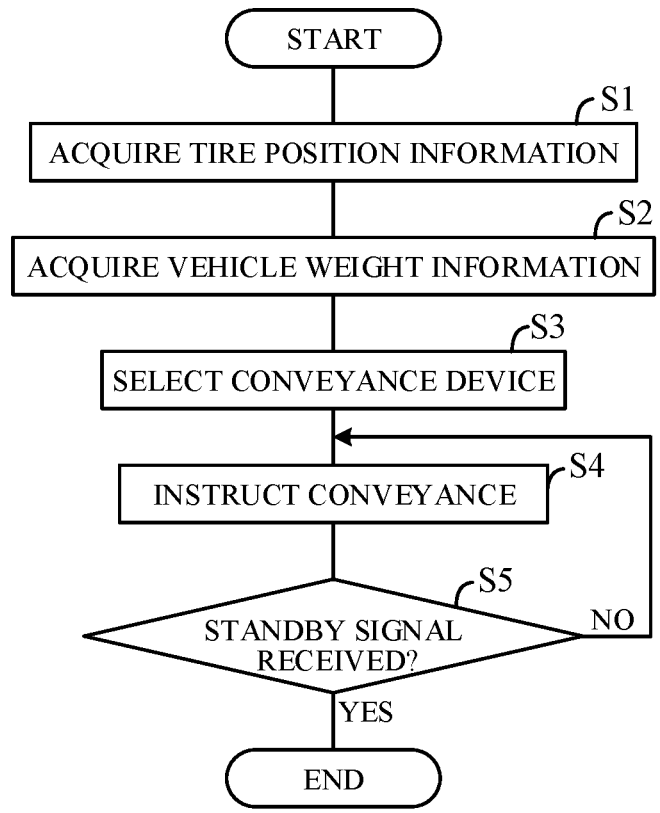
FIG. 7 is a flowchart showing an example of vehicle parking process executed by a processing unit of the server device shown in FIG. 6.

FIG. 7 is a flowchart showing an example of the vehicle 1 parking process executed by the processing unit 44 of the server device 4 shown in FIG. 6. The processing shown in this flowchart, for example, starts when the server device 4 receives a signal instructing a parking request of the vehicle 1 from a wireless communication terminal (not shown) of the user, and ends when the server device 4 receives the standby signal from each conveyance devices 3 that parked the vehicle 1.

First, in S1 (S: processing step), the tire position information acquisition unit 441a acquires the tire position information of each tire 10 of the vehicle 1 detected by the vehicle information detection device 2. Next, in S2, the weight information acquisition unit 441b acquires the vehicle weight information of the vehicle 1. S1 and S2 may be performed simultaneously or in reverse order.

Next, in S3, the selection unit 442 selects the conveyance devices 3 of the same number as the number of tires, i.e., four conveyance devices 3, that can lift the vehicle 1. At this time, depending on the vehicle type of the vehicle 1, the conveyance device 3 for the front wheel tire 10 and the conveyance device 3 for the rear wheel tire 10 may be different conveyance devices 3 differ in the carrying capacity. For example, the small conveyance device 3A may be selected for the front wheel tire 10 and the medium conveyance device 3B may be selected for the rear wheel tire 10.

Next, in S4, the conveyance instruction unit 443 outputs the conveyance instruction (or instructs conveyance) of the vehicle 1 to the parking space 12 to the four conveyance devices 3 selected by the selection unit 442. Next, in S5, the processing unit 44 determines whether standby signal from each of the four conveyance devices 3 that parked the vehicle 1 is received. If the result is negative in S5, S4 and S5 are repeated until standby signal is received. On the other hand, if affirmative in S5, the parking process is terminated.

Figure 8:
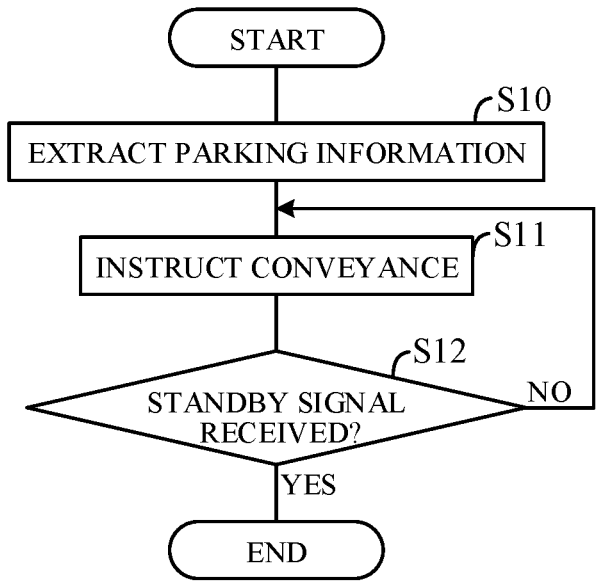
FIG. 8 is a flowchart showing an example of vehicle exit process executed by a processing unit of the server device shown in FIG. 6.

FIG. 8 is a flowchart showing an example of the vehicle 1 exit process executed by a processing unit 44 of the server device 4 shown in FIG. 6. The processing shown in this flowchart, for example, starts when the server device 4 receives a signal instructing an exiting request of the vehicle 1 from the wireless communication terminal (not shown) of the user, and ends when the server device 4 receives the standby signal from each conveyance devices 3 that made the vehicle 1 exit.

First, in S10, the conveyance instruction unit 443 extracts the parking information stored in the conveyance information data base 432. Next, in S11, the conveyance instruction unit 443 outputs the convey instruction (or instructs conveyance) of the vehicle 1 to the extracted four conveyance device 3. Next, in S12, the processing unit 44 determines whether standby signal from each of the four conveyance devices 3 that conveyed the vehicle 1 is received. If the result is negative in S12, S11 and S12 are repeated until standby signal is received. On the other hand, if affirmative in S12, the parking process is terminated.

The present embodiment can achieve advantages and effects such as the following:

(1) The server device 4 controls the plurality of conveyance devices 3 that lift each tire 10 of the vehicle 1 to convey the vehicle 1 to the parking space 12 in the parking lot 11. The server device 4 includes: the tire position information acquisition unit 441a that acquires the tire position information of each tire 10 of the vehicle 1 detected in the information acquisition area 13; the selection unit 442 that selects the conveyance devices 3 to be used from among the plurality of conveyance devices 3 different in conveyance capacity for lifting each tire 10 of the vehicle 1 to convey the vehicle 1 based on the tire position information of each tire 10 of the vehicle 1 acquired by the tire position information acquisition unit 441a; and the conveyance instruction unit 443 that outputs the conveyance instruction of the vehicle 1 to the parking space 12 to the conveyance devices 3 selected by the selection unit 442.

This configuration eliminates the need to arrange parking staff for guiding the vehicle 1 operated by the driver and to prepare the driver's waiting room and the like, thereby streamlining the management of the parking lot 11. In addition, by acquiring the tire position information of each tire 10, selecting the conveyance devices 3 capable of lifting the vehicle 1 on the basis of the tire position information, and then dispatching it to the vehicle 1, it is possible to efficiently carry out the automated parking of the vehicle 1. In addition, the vehicle 1 can be parked at a higher density by bringing the vehicle 1 into close contact with each other than before. Consequently, the parking lot 11 management is expected to be streamlined and the parking lot 11 earnings are expected to improve.

(2) The conveyance instruction unit 443 transmits the tire position information of each tire 10 of the vehicle 1 instructed to be conveyed, to each of the selected conveyance devices 3. Thus, since each tire 10 is not searched for in each of the four conveyance devices 3 and is positioned to each tire 10 by moving the four conveyance devices 3 based on the transmitted tire position information, it is possible to move each conveyance device 3 to the position of each tire 10 easily and accurately as compared with the case where each tire 10 is searched for in each conveyance device 3. It also allows the vehicle 1 to be quickly ready for conveyance. Furthermore, for example, there is no need to provide a large-scale function for setting the initial position to the conveyance device 3 itself, which leads to cost-reduction and miniaturization.

(3) The vehicle information acquired by the vehicle information acquisition unit 441 further includes the weight information of the vehicle 1 detected in the information acquisition area 13. The selection unit 442 selects the conveyance devices 3 to be used based on the weight information acquired by the vehicle information acquisition unit 441. As a result, multiple types of conveyance devices differing in the conveyance capacity can be deployed, so that, for example, an inexpensive and high maneuverability conveyance device having a small conveyance capacity can be actively utilized.

(4) The weight information acquired by the vehicle information acquisition unit 441 includes front and rear weight information of the vehicle 1. The selection unit 442 selects the conveyance devices 3 to be used based on the front and rear weight information of the vehicle 1 acquired by the vehicle information acquisition unit 441. With this, it becomes possible to easily cope with parking of the vehicle 1 with different weights in front and rear.

(5) The server device 4 further includes the map information data base 431 that stores the parking position information of the parking space in the parking lot 11. The vehicle information acquired by the vehicle information acquisition unit 441 further includes the size information of the vehicle 1. The conveyance instruction unit 443 outputs the parking space 12 and the conveyance route to the parking space 12 to the conveyance devices 3 selected by the selection unit 442 based on the parking position information stored in the map information data base 431 and the size information of the vehicle 1 acquired by the vehicle information acquisition unit 441. With this, since the size information of the vehicle 1 is acquired together with the tire position information, it becomes possible to calculate the best route or the best parking lot (parking space) without providing additional facilities.

(6) The server device 4 further includes the conveyance information data base 432 that stores the conveyance devices 3 selected by the selection unit 442 and the parking space 12 and the conveyance route instructed by the conveyance instruction unit 443. The conveyance instruction unit 443 outputs the conveyance instruction of the vehicle 1 from the parking space 12 based on the conveyance devices 3, the parking space 12 and the conveyance route stored in the conveyance information data base 432. This configuration eliminates the need to acquire the vehicle information again at the time of exiting, which leads to a reduction in equipment cost and a reduction in exiting time required for acquiring or detecting (measuring) the vehicle information.

(7) The vehicle conveyance control method for controlling the plurality of conveyance devices 3 that lift each tire 10 of the vehicle 1 to convey the vehicle 1 to the parking space 12 in the parking lot 11, includes: acquiring the vehicle information including the tire position information of each tire 10 of the vehicle 1 detected in the information acquisition area 13; selecting conveyance devices 3 to convey the vehicle 1 from among the plurality of conveyance devices 3 different in conveyance capacity for lifting each tire 10 of the vehicle 1 to convey the vehicle 1 based on the tire position information of each tire 10 of the vehicle 1 acquired in the acquiring; and instructing conveyance or outputting the conveyance instruction of the vehicle 1 to the parking space 12 to the conveyance devices 3 selected in the selecting.

With this, the need to arrange parking staff for guiding the vehicle 1 operated by the driver and to prepare the driver's waiting room and the like is eliminated, thereby streamlining the management of the parking lot 11. In addition, by acquiring the tire position information of each tire 10, selecting the conveyance devices 3 capable of lifting the vehicle 1 on the basis of the acquired tire position information, and then dispatching it to the vehicle 1, it is possible to efficiently carry out the automated parking of the vehicle 1.

(8) The vehicle parking system, includes: the above described server device 4; the vehicle information detection device 2 that detects the vehicle information including the tire position information of each tire 10 of the vehicle 1 in the information acquisition area 13; and the plurality of conveyance devices 3 that lifts each tire 10 of the vehicle 1 to convey the vehicle 1 to the parking space 12 in the parking lot 11. This configuration eliminates the need to arrange parking staff resident in the parking lot 11 and the vehicle 1 can be parked at a higher density by bringing the vehicle 1 into close contact with each other than before. Consequently, the parking lot 11 management is expected to be streamlined and the parking lot 11 earnings are expected to improve.

In the above embodiment, the vehicle information acquisition unit 441 is configured to include: the tire position information acquisition unit 441a; the weight information acquisition unit 441b; and the size information acquisition unit 441c. However the present invention is not limited to the above configuration. For example, the vehicle information acquisition unit 441 can be configured to include at least the tire position information acquisition unit 441a.

In the above embodiment, the selection unit 442 is configured to select the conveyance devices based on the tire position information of each tire 10 of the vehicle 1 acquired by the tire position information acquisition unit 441a and the weight information of the vehicle 1 acquired by the weight information acquisition unit 441b. However the present invention is not limited to the above configuration. For example, the selection unit 442 can be configured to select the conveyance devices 3 based on the tire position information of each tire 10 of the vehicle 1 acquired by the tire position information acquisition unit 441a. Alternatively, the selection unit 442 can be configured to select the conveyance devices 3 based on the weight information of the vehicle 1 acquired by the weight information acquisition unit 441b.

In the above embodiment, the tire position information acquisition unit 441a is configured to acquire the front and rear weight information of the vehicle 1, in addition to the total weight information of the vehicle 1 detected by the vehicle information detection device 2. However the present invention is not limited to the above configuration. For example, the tire position information acquisition unit 441a can be configured to acquire at least the total weight information of the vehicle 1 detected by the vehicle information detection device 2.

In the above embodiment, the ball screw mechanism is used as the relative moving mechanism 323 relatively moving the front abutting member 321 and the rear abutting member 322 in the front-rear direction. However the present invention is not limited to the above configuration. For example, other relative moving mechanisms can be used.

In the above embodiment, the GPS sensor 371 receiving signals from GPS satellites is used as a sensor for detecting the position of the conveyance device 3. However the present invention is not limited to the above configuration. For example, if the parking lot is indoors and cannot receive GPS signals from GPS satellites, indoor beacon equipment or indoor GPS equipment that transmits pseudo GPS signals from the ceiling can be used. An equipment that photographs the ceiling by the image sensor and collates it with the SLAM (Simultaneous Localization and Mapping) map installed beforehand to estimate the self-position can be used.

In the above embodiment, although the configuration in which the battery 33 of the conveyance device 3 is replaceable is not described, the battery 33 provided in the conveyance devices 3 may be configured to be detachable (replaceable). In such a case, it is more desirable that the battery 33 configured to be detachable is commonly designed in size and electric characteristics so that it can be shared by the small conveyance device 3A, the middle conveyance device 3B, and the large conveyance device 3C. By designing in this way, without performing the charging of the battery 33 in the standby area 14 provided in the parking lot 11 shown in FIG. 2, since it is only necessary to replace the battery 33, there is no need to provide a plurality of facilities for charging, which is relatively expensive, in the standby area 14, it is possible to reduce the facility cost. When electric power of the conveyance devices 3 having different sizes is insufficient by using the common battery 33, it is possible to cope with the shortage by changing the number of the battery 33 to be used, for example, one battery 33 for the small conveyance device 3A, two batteries 33 for the medium conveyance device 3B, three batteries 33 for the large conveyance device 3C, or the like.

In the above embodiment, although the conveyance devices 3 having the same mechanism moves to each tire 10 of the vehicle 1 to raise the tire 10 as shown in FIG. 4B, the mechanism of only two conveyance devices 3 can be simplified, for example. Specifically, the two conveyance devices 3 can have the omni-wheel or mechanical wheel simplified to a degree enough to freely travelable to the vehicle 1, conveying with driving forces of the remaining two conveyance devices 3 when conveying the vehicle 1. With such a configuration, the number of the conveyance devices 3 equipped with expensive omni-wheel or mechanical wheels can be reduced.

The above embodiment can be combined as desired with one or more of the above modifications. The modifications can also be combined with one another.

According to the present invention, it becomes possible to efficiently conduct automatic parking of the vehicle to the parking space in parking lot using conveyance devices.

Above, while the present invention has been described with reference to the preferred embodiments thereof, it will be understood, by those skilled in the art, that various changes and modifications may be made thereto without departing from the scope of the appended claims.

What is claimed is:

1. A vehicle conveyance control apparatus for controlling a plurality of conveyance devices configured to lift each tire of a vehicle to convey the vehicle from a predetermined area of a parking lot to a parking space, the vehicle conveyance control apparatus comprising:
   a processor and a memory coupled to the processor, wherein the processor is configured to perform:
   acquiring vehicle information including tire position information of each tire of the vehicle, and front weight information and rear weight information of the vehicle detected in the predetermined area;
   selecting a front conveyance device having conveyance capacity for lifting a front wheel tire of the vehicle to convey the vehicle and a rear conveyance device having conveyance capacity for lifting a rear wheel tire of the vehicle to convey the vehicle from among the plurality of conveyance devices different in conveyance capacity for lifting each tire of the vehicle to convey the vehicle based on the tire position information, the front weight information, and the rear weight information of the vehicle; and
   instructing the front conveyance device and the rear conveyance device to convey the vehicle from the predetermined area to the parking space.

2. The vehicle conveyance control apparatus according to claim 1, wherein the processor is further configured to perform:
   outputting the tire position information of the vehicle to the conveyance devices.

3. The vehicle conveyance control apparatus according to claim 1, wherein
   the memory is configured to store parking position information of the parking space in the parking lot, wherein
   the vehicle information further includes size information of the vehicle, wherein the processor is configured to perform:
   the outputting including outputting to the conveyance devices, the parking position information and a conveyance route from the predetermined area to the parking space based on the parking position information stored in the memory and the size information of the vehicle.

4. The vehicle conveyance control apparatus according to claim 3, wherein
   the memory is further configured to store the conveyance devices, the parking position information, and the conveyance route, wherein the processor is configured to perform:
   the instructing including instructing conveyance of the vehicle from the parking space based on the conveyance devices, the parking position information, and the conveyance route stored in the memory.

5. A vehicle conveyance control method for controlling a plurality of conveyance devices configured to lift each tire of a vehicle to convey the vehicle from a predetermined area of a parking lot to a parking space, the vehicle conveyance control method comprising:
   acquiring vehicle information including tire position information of each tire of the vehicle, and front weight information and rear weight information of the vehicle detected in the predetermined area;
   selecting a front conveyance device having conveyance capacity for lifting a front wheel tire of the vehicle to convey the vehicle and a rear conveyance device having conveyance capacity for lifting a rear wheel tire of the vehicle to convey the vehicle from among the plurality of conveyance devices different in conveyance capacity for lifting each tire of the vehicle to convey the vehicle based on the tire position information, the front weight information, and the rear weight information of the vehicle; and
   instructing the front conveyance device and the rear conveyance device to convey the vehicle from the predetermined area to the parking space.

6. A vehicle conveyance system, comprising:
   the vehicle conveyance control apparatus according to claim 1;
   a vehicle information detection device configured to detect the vehicle information including the tire position information of each tire of the vehicle in the predetermined area; and
   the plurality of conveyance devices different in conveyance capacity for lifting each tire of the vehicle to convey the vehicle from the predetermined area to the parking space.

7. The vehicle conveyance system according to claim 6, wherein
   each of the plurality of conveyance devices includes front wheels and rear wheels and is configured to be movable in a front-rear direction and a left-right direction, wherein
   a front axle of the front wheels and a rear axle of the rear wheels respectively include an abutting member configured to abut on each tire of the vehicle, wherein
   each of the plurality of conveyance devices further includes a relative moving mechanism configured to move one of the front axle and the rear axle toward the other of the front axle and the rear axle.

8. The vehicle conveyance system according to claim 7, wherein the relative moving mechanism includes:
   a screw shaft;
   a nut member configured to be movable on the screw shaft in accordance with rotation of the screw shaft; and
   a motor, wherein one of the front axle and the rear axle is fixed to the nut member, wherein the other of the front axle and the rear axle is fixed to the screw shaft, wherein the relative moving mechanism further includes:
   a small diameter gear configured to integrally rotate with an output shaft of the motor; and
   a large diameter gear configured to mesh with the small diameter gear and configured to integrally rotate with the screw shaft.

* * * * *